United States Patent
Lewis

(10) Patent No.: US 7,583,401 B2
(45) Date of Patent: Sep. 1, 2009

(54) PORTAL FOR DISTRIBUTING BUSINESS AND PRODUCT INFORMATION

(75) Inventor: Brad Lewis, Gilroy, CA (US)

(73) Assignee: Snap-On Technologies, Inc., Lincolnshire, IL (US)

( * ) Notice: Subject to any disclaimer, the term of this patent is extended or adjusted under 35 U.S.C. 154(b) by 932 days.

(21) Appl. No.: 10/610,402

(22) Filed: Jun. 27, 2003

(65) Prior Publication Data

US 2004/0003050 A1 Jan. 1, 2004

Related U.S. Application Data

(60) Provisional application No. 60/392,322, filed on Jun. 27, 2002.

(51) Int. Cl.
G06K 15/00 (2006.01)
G06F 3/00 (2006.01)
H04N 1/42 (2006.01)
G06F 15/16 (2006.01)

(52) U.S. Cl. .................... 358/1.16; 358/1.15; 358/435; 358/476; 358/444; 709/208

(58) Field of Classification Search ............... 358/1.15, 358/1.16, 435, 476, 444; 709/218, 219, 208; 455/440
See application file for complete search history.

(56) References Cited

U.S. PATENT DOCUMENTS

| 6,112,206 | A | * | 8/2000 | Morris et al. ................. 707/10 |
| 6,611,740 | B2 | * | 8/2003 | Lowrey et al. ................ 701/29 |
| 6,636,831 | B1 | | 10/2003 | Profit, Jr. et al. | |

| 2001/0054087 | A1 | 12/2001 | Flom et al. |
| 2005/0256937 | A1 | 11/2005 | Lewis |

FOREIGN PATENT DOCUMENTS

EP 0950 971 A2 10/1999

OTHER PUBLICATIONS

Office action mailed by the U.S. Patent Office on Mar. 11, 2008 for U.S. Appl. No. 10/519,533.
Office action mailed by the U.S. Patent Office on Jul. 24, 2007 for U.S. Appl. No. 10/519,533.
Office action, mailed by the U.S. Patent Office on Oct. 31, 2008 for U.S. Appl. No. 10/519,533.

* cited by examiner

*Primary Examiner*—Edward L Coles
*Assistant Examiner*—Thomas J Lett
(74) *Attorney, Agent, or Firm*—McDonnell Boehnen Hulbert & Berghoff LLP

(57) ABSTRACT

A portal for transferring information between a master server and a third-party client using a transportable replicating server is provided. The portal may be particularly useful for and may provide a significant cost advantage and benefit when access to front and back-office servers is limited or not accessible. The master server may replicate information (e.g., applications and data) from the front and back-office servers to the replicating server. After replication, the replicating server appears to third-party clients as the front and back-office servers, containing the functionality and data to facilitate front and back-office operations.

Being transportable, the replicating server can move from a first location at which the replicating server can communicate with the master server to a second location at which the replicating server can communicate with the third-party clients. At the second location, the information on the replicating server may be communicated to the third-party devices.

38 Claims, 5 Drawing Sheets

PORTAL FOR DISTRIBUTING BUSINESS AND PRODUCT INFORMATION

REFERENCE TO RELATED APPLICATIONS

This application claims the benefit of U.S. Provisional Application No. 60/392,322, entitled "Use Of XML Protocols For Updating Repair Equipment, Diagnostic Equipment, Tools," filed Jun. 27, 2002.

FIELD

This following relates to computer networks, and more particularly, to distributed computer networking for transferring information between a master device and at least one third-party device using a transportable, replicating device. The distributed computer network is particularly useful for transferring information from back office and front office servers to third-party clients or peers using a transportable, replicating server.

BACKGROUND

With recent advances in computing networks and convergence of computing technologies with communication technologies, real time or at least near real time transmission of information has become possible. During early stages of convergence, the architecture of the computing and communication nodes or devices on the networks became more complex. This lead to many deployment and security problems as much of the computing applications and processing stayed resident on the local computing devices. To combat these concerns, a great deal of the computing applications and processing has been transferred upstream to centralized (although distributed) computing systems, leaving little processing and data on the local devices.

The rapid expansion and acceptance of the Internet, passive and active internet browsers, and multipoint communications has also fostered centralized systems. Among the different computing models, the centralized systems may take the form of client/server or master/servant systems. Common wisdom of the computing arts believes that by leaving little processing and data on local devices (e.g., thin client/processing), the computing and communications systems can be more easily deployed by not having to track device software capabilities and versions, for example. Further, access to processing and data may be more easily secured, because not only is the processing and data information not locally available for malicious modification, but various authentication and authorization schemes, such as private/public key encryption, can be implemented upon a call for service from the clients.

These systems function well when the client or servant devices have access to and are connected to the serving computer and communication networks. Often, however, people have to travel to locations away from communicable access to their servers, making the client applications, for the most part, useless. For instance, many people's job responsibilities require them to take their client devices to their customers or other locations where they do not have easy connection to their servers. Without access, the client applications cannot assist in providing important information for carrying out their job responsibilities. While dial-up networking via a modem, a connection through remote servers via a Virtual Private Network (VPN), and/or a connection through one or more wireless networks is possible, thin clients still require most, if not all the information to be downloaded through these connections.

Given that many large files may be transferred, such connections may not be advisable and may hinder performing the person's job responsibilities as the connections can be slow. And if the client device is then used as a server or peer device to communicate with customer's client or peer devices, such communications can experience delays and other inconveniences on-top of the delays inherent in the latter communications. Further, the cost of exchanging data over public and/or private wireless communications systems to which the client pays a subscription, while decreasing, is still quite expensive, especially during peak hours.

Many times, real time or near real time information is not needed. Rather, fairly current and fully functional services may be more beneficial for those who do not have access or have limited access to their servers. Instead of transporting or carrying around a partially functional client device, what is needed is a method and system for providing a convenient and fully functional server or peer services without the need for actual connection to the originating servers. Further, when real time or near real time information is required, such a system and method may beneficially employ architecture and steps to minimize connect time to the originating servers so as to reduce complexity, costs and other engineering and business matters.

SUMMARY

A system and method for transferring information between a master device and at least one third-party device using a replicating device is provided. The system and method may facilitate this information transfer by (i) replicating to the replicating device via a first communication link at least a portion of information stored on the master device; (ii) transporting the replicating device to a location out of communicable proximity of the master device and into communicable proximity of at least one third-party device; and (iii) communicating at least a portion of the information between the replicating device and the third-party device via a second communication link.

BRIEF DESCRIPTION OF THE DRAWINGS

Exemplary embodiments are described below in conjunction with the appended drawing figures, wherein like reference numerals refer to like elements in the various figures, and wherein.

DETAILED DESCRIPTION

In the following detailed description, numerous specific details are set forth in order to provide a thorough understanding of exemplary embodiments described herein. However, it will be understood that these embodiments may be practiced without the specific details. In other instances, well-known methods, procedures, components and circuits have not been described in detail, so as not to obscure the following description. Further, the embodiments disclosed are for exemplary purposes only and other embodiments may be employed in lieu of or in combination with of the embodiments disclosed.

1. Exemplary Architecture

Figure 1:
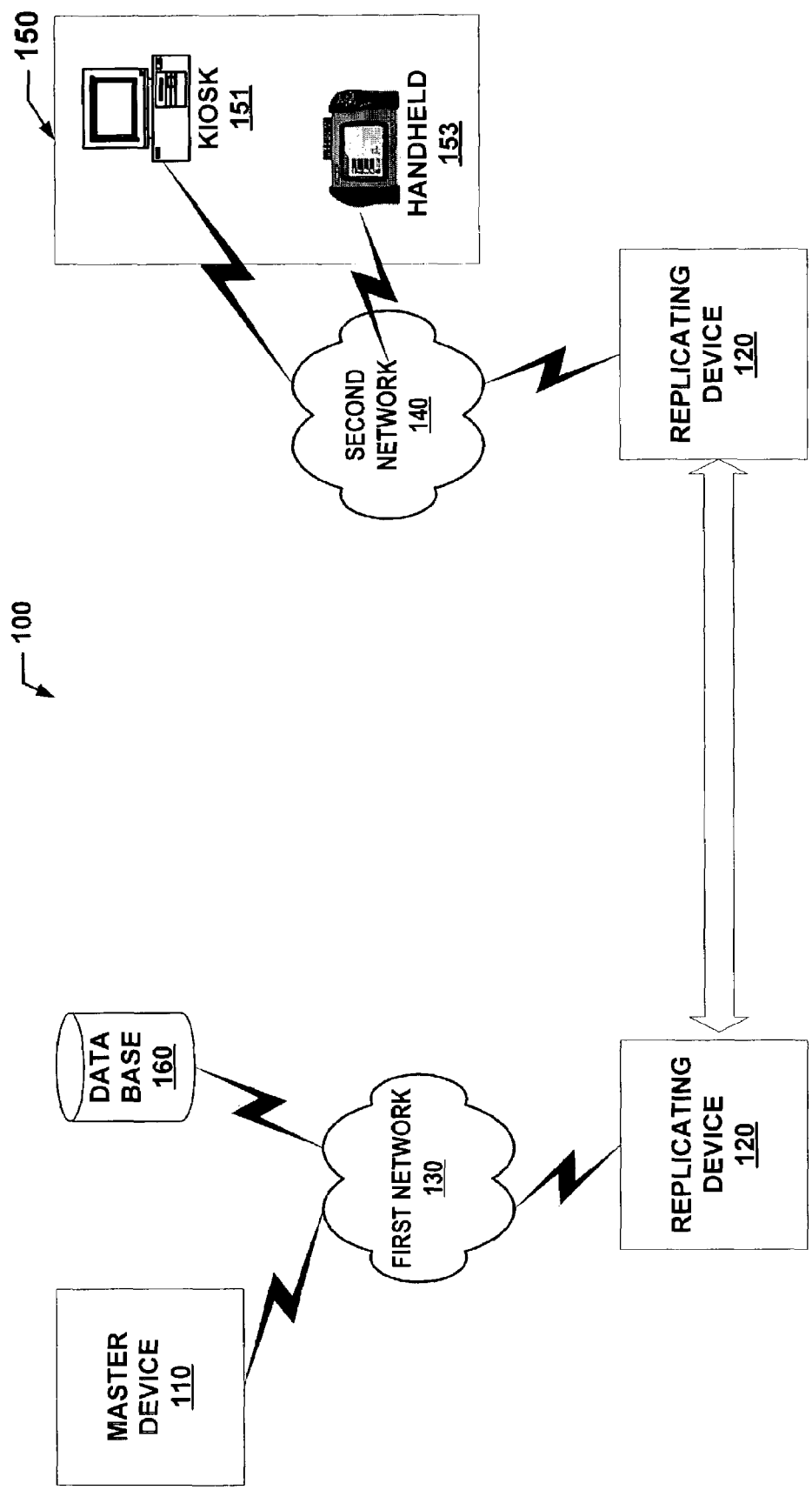
FIG. 1 is a first block diagram illustrating a first exemplary network architecture for transferring information between a master device and one or more third-party devices using a transportable, replicating device.

FIG. 1 illustrates exemplary network architecture 100 for transferring information between a master device 110 and one or more third-party devices 150, such as kiosks and handheld computing devices 151, 153. A replicating device 120 may be communicatively coupled to the master device 110 and the third-party devices 150, albeit at different times. The replicating device 120 may be transported from within communicable proximity of the master device 110 to within communicable proximity of the third-party devices 150 and vice versa.

The master device 110 may comprise one or more server-based computer systems providing individual server services, including proxy, registration and authentication services, application services, media services, and/or Web services, for instance. Among the server services installed and operating on the server-based computer system may be one or more front-office applications, i.e., software that interfaces with the customer directly, and/or back-office applications, i.e., software that does not interact directly with the customer.

The front-office applications may provide the functionality and the data necessary to take orders, configure complex products, and provide effective service and support to customers. Further, the front-office applications may include customer relationship management (CRM), sales force automation, customer support, and field service.

Back-office applications may provide functionality for internal operations such as enterprise resource planning (ERP), inventory control, manufacturing and all of the supply chain activities associated with procuring goods, services and raw materials, such as a dealer-sales system (DSS) noted below. ERP systems that include order entry and customer service capabilities may provide a bridge between the back-office and front-office applications.

The server-based computer system embodiment of the master device 110 may employ one or more processors that can be coupled to, integral to, or integrated with one or more data storage devices. Thus, processing and data management may be concentrated or distributed among a number of computers. In any case, the computer system may be adapted to run an operating system and a plurality of applications. As noted above, the master device 110 may be any of a plurality of hardware platforms, and thus, may be adapted to run one or more of a plurality of standard and/or proprietary operating systems.

Like the master device 110, the replicating device 120 may be deployed as one or more server-based computer systems that provide individual server services, including proxy, registration and authentication services, application services, media services, and/or Web services. Through replication or mirroring, i.e., the ability to keep distributed databases and software applications ("information") synchronized by routinely copying entire or subsets of the information to other servers in the network, the replicating device 120 may stay current with the master device 110. Unlike the master device 110, however, the replicating device 120 is transportable. The replicating device 120 may be housed or otherwise fitted in a handheld computing device, a cart, and/or a vehicle, for instance.

Replication or mirroring may be carried out in various ways. For instance, replication may be performed using primary site replication, shared replication, symmetric replication, failover replication. Primary replication maintains the master copy of the information in one site, such as the master device 110, and sends read-only copies to one or more other sites, such as the replicating device 120. The read-only copies can be stored under a different name at a later time. In a workflow environment, the master copy can move from one site to another. This is called "shared replications" or "transferred ownership replication." In symmetric replication, also called "update-anywhere" or "peer-to-peer replication," each site can receive updates, and all other sites are then updated. Failover replication, or hot backup, maintains an up-to-date copy of the data at a different site for backup. Mirroring may be defined as duplicating the information onto another computer at another location. Mirroring may be performed to be in closer proximity to the third-party devices 150.

Among the server services installed and operating on the server-based computer system embodiment of the master device 110 that may be replicated to the replicating device 120 are one or more the front and back-office applications. Some or all of the services installed on the master device 110 may be replicated to the replicating device 120.

An operating system typically resides in a part of one or more memories, caches, or data storage of the computing systems of master and replicating devices 110, 120. This area is typically known as the operating system or kernel space. The core of the operating system, which may be referred to as kernel code, handles matters such as process scheduling, memory management, hardware communication and network traffic processing. Applications, which are made of application code, are stored in a separate portion of memory. In operation, the kernel code and application code are maintained in separate portions of memory and are each executed by the computer processor (or multiple processors). Thus, the kernel code is said to be running in "kernel space," and application code is said to be running in application or "user space." Applications, however, may use the kernel code to access system resources and hardware through system calls, and are therefore thought of as running above, or on top of, the kernel.

In addition to the server applications, the master device 110 and replicating device 120 may include one or more system extensions, one or more communication applications, one or more user interface extensions, and/or one or more access-layer applications. The system extensions may provide a standardized method for adding or removing functionality, such as supplying communication protocols for accessing, communicating, and replicating to the replicating device 120, the third-party devices 150, and other portions of the master device 110.

The system extensions may provide this functionality without modifying the operating system and/or hardware of the master device 110 and replicating device 120. And the system extensions allow the master and replicating devices 110, 120 to be scalable, distributable, and portable (i.e., easily ported to different systems).

The system extensions may reside in the application space when loaded in memory or stored in a data store of the computing system, such as a disk drive and/or other mass storage media (not shown), when inactive. The system extensions may be deployed as dynamic link libraries (DLLs) and/or shared libraries if the computing platform of the computing system supports them. Alternatively, the system extensions may be deployed as statically-linked libraries. The system extensions may take other forms as well.

When needed, the system extensions may be called by an access-layer application and loaded into memory of the computing system to provide the additional functionality. The system extensions may be written so that their functionality is shared by more than one application (e.g., communication applications and replication applications) at the same time (i.e., reentrant code). Moreover, the master and replicating devices 110, 120 may share or have complementary system extensions.

The replication application and/or the shared components thereof may contain functionality for replicating the service applications, such front-office and back-office applications, and for policy processing of one or more parameters for determining which of the service application are to be replicated. The policy processing may include business logic, business measures, look-up rules, value driven and cosmetic modifications, data resolution, analytics, presentation, component and track transaction activity; knowledge-base generation and storage, server/client or peer-to-peer queries or functions to remote devices, such as the third-party devices 150, and other policy-based decision criterion for determining which of the service applications are to be replicated.

The service and replication applications may reside in the application space when loaded in memory or stored in a data store associated with the master and replicating devices 110, 120, such as a disk drive and/or other mass storage media (not shown), when inactive. These applications may be deployed as stand-alone executable programs, one or more dynamic link libraries and/or shared libraries if the computing platform of the computing system supports them. Alternatively, the applications may be deployed as statically-linked libraries.

Then again, the applications may be incorporated into or otherwise distributed among a various linked data stores, such as database 160. This distributed code may work with the computing systems of the master and replicating device 110, 120 to form a complete application.

The data store may be concentrated or distributed among various components of these devices, and/or an external mass storage device (not shown). Moreover, the data store may be communicatively coupled to the computing systems of the master and replicating devices 110, 120 via a first network 130 through which replication can occur.

When activated (through, e.g., some data-driven automation or interaction with a user), the service and replication applications that interface with the operating system and/or access-layer applications are loaded into memory of the computing systems of the master and replicating devices 110, 120 to provide the desired functionality. These applications may be written so that their functionality is reentrant-type code.

The first network 130 may be deployed to carry out the replication communication between the master and replicating devices 110, 120. This first network 130 may be a partial or full deployment of most any communication or computer network, and thus, can include a few or many network elements, most of which are not shown. As a communication network, the first network 130 can include circuit-switched as well as packet-data elements to provide transport of data (and voice) communications between master and replicating devices 110, 120. It can be public or private, terrestrial wireless or satellite, and/or wireline.

Public wired and/or wireless networks typically provide telecommunications and other networking services in a particular geographic coverage area to its subscribers. And generally, any interested member of the public meeting minimal criteria may become a subscriber of public network. In the case of wireless or satellite networks, public networks typically provide coverage to other wireless networks' subscribers who are roaming within the coverage area of network as well.

Additionally, the coverage area of public network is typically wide-ranging. For example, the coverage area of a wireless public network may encompass a metropolitan area, a substantial part of a metropolitan area, or numerous metropolitan areas. When integrated with public wired networks, the combined networks provide national along with international coverage. Thus, the first network 130 may include portions of a Public Switch Telephone Network (PSTN), the Internet, core and proprietary public networks, and/or wireless voice and packet-data networks (e.g., 1G, 2G, 2.5G and 3G telecommunication networks).

The first network 130 may be a private or "enterprise" wired or wireless network as well. Unlike public networks, private networks advantageously provide greater control over the network, which in turn allows vast customization of the services provided to the network's users and/or subscribers.

These networks are "private" in that the networks' coverage areas are more geographically limited. Typically, but not necessarily, subscription to such private networks is limited to a select group of subscribers. Certain credentials may be needed for authentication and other security measures. Networks deployed by many enterprises that only allow their employees, customers, vendors, and suppliers to subscribe exemplify these private networks.

For example, many enterprises, Small Office/Home Office (SOHO) entities, and private individuals have private-wireline-switching systems. These private-wireline-switching systems may include, for example, private branch exchanges (PBXs) and/or media gateways. The private-wireline-switching systems switch, couple or otherwise connect communications (i) internally, i.e., among the subscribers of the network and (ii) externally, i.e., between the subscribers of the private network and subscribers of public networks.

In addition to the wireline networks, enterprises, SOHOs and private individuals are increasingly deploying private wireless communication systems, such as wireless office telephone systems ("WOTS") and/or wireless local area network (WLAN), in lieu of or in addition to wireline switching systems. Similar to public networks, private networks may be integral to or integrated with other private and public satellite, terrestrial wireless, and wireline networks to provide national and international coverage.

As most network elements are not shown, the network 130 illustrated in FIG. 1 may include at least one wired or wireless access point and gateway through which the master and replicating devices 110, 120 can communicate. Alternatively, both the master and replicating device 110, 120 may employ or be configured with complementary wired or wireless access points and gateways and a common transport over which they may communicate.

Different formats and protocols may be used for communicating over the first network 130. For example, the formats and protocols for communicating over a wired first network 130 may be according to the Advanced Intelligent Network (AIN)/Signaling System 7 (SS7) and other POTS systems. In the case of a wireless network, the formats and protocols may be according to commonly used public wireless interface formats, such as Advanced Mobile Phone Service (AMPS), Time Division Multiple Access (TDMA), Global System for Mobile Communications (GSM), and Code Division Multiple Access (CDMA), Universal Mobile Telecommunications Service ("UMTS"), Wide-band CDMA ("WCDMA"), CDMA2000, and Generic Packet Radio Services ("GPRS"). In a private network, the format of the wired or wireless interface may be based on Ethernet (IEEE 802.3), TIA's IS-94 specifications, the Bluetooth specification, the IEEE 802.11 standards, other WOTS or WLAN specifications, in addition to the formats and/or protocols of the public wireless and/or wireline networks.

The first network 130, like the network 100 as a whole, may also include various interconnected network elements to provide one or more segments of a communication path between the master and replicating devices 110, 120. The network 130 may include elements of public and/or private communication networks as noted above. And in practice, it can be deployed with elements of Public Switched Telephone Networks, such as the hardware and services provided by local exchange carriers (LECs) and interexchange carriers (IXCs); private wireline networks, such as enterprise Private Branch Exchange; and/or public and private wireless networks, such as a license-free, Industrial, Scientific and Medical (ISM) band wireless network.

In an exemplary embodiment, the master and replicating devices 110, 120 may be integrated with or coupled with an IEEE 802.11 wireless access point and communication card. Recently, the IEEE promulgated the IEEE 802.11 standards to define the communication protocols between devices, such as the master and replicating devices 110, 120, and network access points that bridge them to a local area network (LAN). The contents of this standard are incorporated herein by reference.

One major advantage of using a wireless local area network (WLAN) that conforms to the IEEE 802.11 standard is the ability to use freely-available, unlicensed spectrum, including the Industrial, Scientific, and Medical (ISM) band. Another advantage provided by the 802.11 standard is the specified support for the 1-Mps, 2-Mps, and the recently added 5.5-Mps, 11-Mps 22-Mps, and 54-Mps transmission speeds. In the near future, the IEEE standard may support transmission speeds of 108 Mps. While the IEEE 802.11 standard loosely defined a portal or bridge function, the portal or bridge function indicates how to interface with other networks, thereby allowing incorporation into many different networks. Although the coverage or range of the WLAN may be presently limited, its relatively low cost, free use, and flexibility make it desirable for replication.

Once replicated, the replicating device 120 may be transported into communicable proximity of the third-party devices 150. As a result, the replicating device 120 may move out of communicable proximity of and terminate any communication link with the master device 110. Once in communicable proximity of the third-party devices 150, the replicating device 120 may establish a communication with one or more of the third-party devices 150 via a second network 140.

The second network 140, like the first network 130, may be a partial or full deployment of most any communication or computer network, and thus, can include a few or many network elements, most of which are not shown. As a communication network, the second network 140 can include circuit-switched as well as packet-data elements to provide transport of data (and voice) communications between replicating and third-party devices 120, 150. It can be public or private, terrestrial wireless or satellite, and/or wireline as noted above.

The second network 140 provides a second communication path, which may be bidirectional. Paralleling the first network 130, the second network 140 may include at least one wired or wireless access point and gateway through which the replicating and third-party devices 120, 150 can communicate. Alternatively, the replicating and third-party devices 120, 150 may employ or be configured with complementary wireless access points, gateways and a common transport over which they may communicate. The second network 140 may be deployed in any of the formats listed above, and does not have to be the same as the first network 130.

The second network 140 may also include various interconnected network elements to provide one or more segments of the communication path between the replicating and third-party devices 120, 150. And the second network 140 may include elements of public and/or private communication networks as noted above.

Like the first network 130, the second network 140 may be deployed according the IEEE 802.11 standard. One advantage of using a WLAN such as the IEEE 802.11, is the ease and the somewhat insubstantial (and declining) cost of equipping and/or integrating a wireless access point and/or communication card into the replication device 120 as well as equipping the third-party devices 150 with communication cards. Equipping the third-party devices 150 with a communication card or integrated-communication chipset allows for considerable customization of the third-party devices 150 as will be described below.

Both the first and second networks 130 and 140 may be communicatively coupled to a common or third transport network (not shown) through which their respective access points and gateways may pass information. This common or third network may be configured as any other network described above and may not only support replication of at least a portion of the information on the replicating server, but also serve as a conduit for passing information, such as time sensitive pricing data, between the replicating device 120 and requesting third-party devices 150.

The third-party devices 150 may be automotive scantools; information kiosks, such as kiosk 151, other automotive service and diagnostic tools, such as diagnostic tool 153; personal digital assistants (PDAs); personal computers; wireless phones; and/or other network or telecommunication devices. As such, each of the third-party devices 150 may deploy one or processors, data storage, proprietary or standardized operating systems, and client-side or peer service applications for performing designated, replicated, and other tasks.

As noted, the third-party devices 150 may be equipped with communication cards and/or chip sets. Correspondingly, the third-party devices 150 may deploy client-side or peer communication applications and extensions for carrying out communications with the replicating device 120.

With such capabilities, the cost and complexity of manufacturing the third-party devices 150 may be greatly decreased, while sales revenue for individual target applications (i.e., the designed tasks of the third-party device) may be increased. If, for example, the third-party device 150 is embodied as a handheld diagnostic tool for which many vehicle applications exist, e.g., measuring and/or detecting battery voltage, idle speed, engine rpm, and/or cam anomalies, the handheld tool may be manufactured with a standard set of hardware and standard operating system, but be void of vehicle applications. When the handheld device is sold to a shop owner or technician, for example, the shop owner or technician can purchase one or more of the vehicle applications.

The handheld device may then be configured for the purchased vehicle applications via information transfer from the replicating device 120. This leads to simplified manufacturing, test and quality checks of the handheld device in-house. In this manufacturing model, verification of only the purchased vehicle applications is done at the customer's site. This manufacturing model is not limited to handheld tools and the configuration may be done in various other ways as well. In addition to reducing costs, new vehicle applications and/or non-purchased updates may be purchased as they become available, increasing the potential for new sales.

Depending of the task to be performed, the processor, data storage, and application complexity of the third-party devices 150 may vary. For more demanding tasks, such as handheld diagnostic tools, processor power and speed, data storage capacity, and application interworking may be much greater than those deployed in a purely informational kiosk. In addition, specialty processors and peripherals may be deployed were the need arises.

For example, a multimedia kiosk for displaying video and audio presentations of the latest products and features may be deployed with one or more high speed processors and large capacity data storage. Given the large size of most present multimedia presentations, this kiosk may be deployed with a wired or wireless broadband connection, e.g., high-speed IEEE 802.11 connection, to download such information from the replicating device 120. Thus, the third-party devices 150 may employ most any processor, data storage, operating system, and application.

2. Exemplary Deployment

Figure 2:
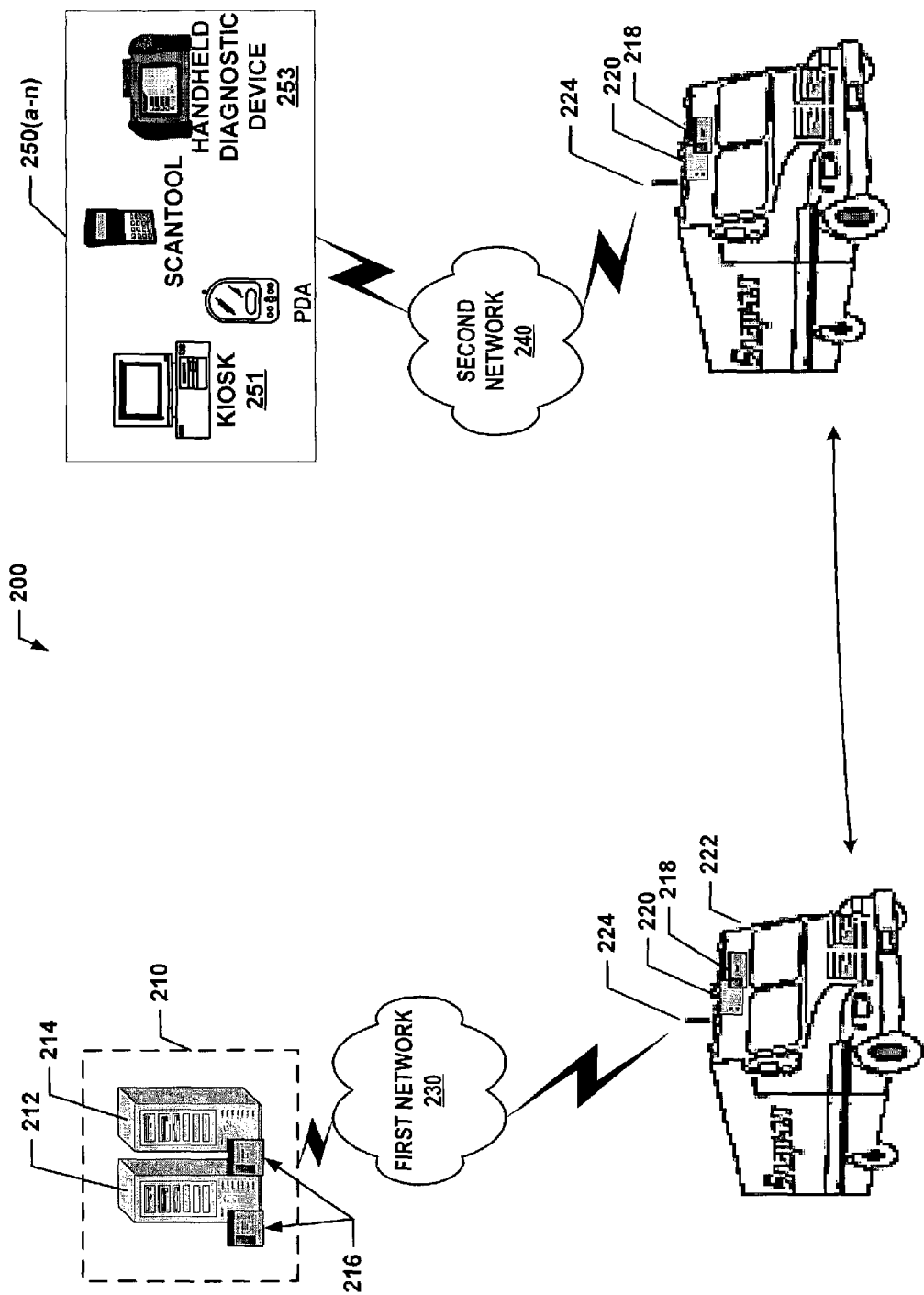
FIG. 2 is a second block diagram illustrating a second exemplary network architecture for transferring information between a master server and one or more third-party clients using a transportable, replicating server.

FIGS. 2-5 illustrate exemplary network architecture 200 and processes for transferring information between a master server 210 and one or more third-party clients, such as third-party clients 250(*a-n*) in accordance with an exemplary embodiment. The network architecture 200 in FIG. 2 is similar to the network architecture 100, except as defined herein. The deployment of the network architecture 200 may be particularly useful for and may provide a significant cost advantage and benefit to sales and marketing personnel, franchisees, and others who have limited access to front and back-office servers while performing their jobs.

For example, many sales and marketing personnel and franchisees travel to customer premises to sell their wares, provide product and service information, update and service previously sold products, update customer accounts, process billing and other accounting measures, and/or communicate other information to their customers. While on the road, these people generally do not have or have limited access to the front and back-office servers 212, 214 and applications 216. Consequently, the sales and marketing personnel and franchisees have to call back or otherwise contact their customers at a later time.

With the present network architecture 200 and related processes, however, the sales and marketing personnel and franchisees can replicate at least a portion of the information (e.g., applications and data) stored on the front and back-office servers 212, 214 to a transportable, replicating server 220 before traveling to their customers. After replication, the replicating server 220 appears as the front and back-office servers 212, 214 to third-party clients, containing the functionality and data to carry out front and back-office operations.

Being transportable, the sales and marketing personnel and franchisees can move from the replicating location to their customer premises, without being tethered or wirelessly coupled to the front and back-office servers 212, 214. When they arrive at their customers, the information on the replicating server 220 may be communicated to their customers and customer's devices 250(*a-n*).

The present network architecture 200 and related processes may be applied to many business models. For example, Snap-on Incorporated employs a franchisor/franchisee business relationship to carry out its sales and distribution. In this relationship, the franchisee or "Dealer" uses a motor vehicle 222, such as a cargo van ("Dealer Van"), to carry out the sales and distribution for Snap-on Incorporated. The Dealer travels to customers as often as once a week, selling tools or carrying out other business. During off hours, the Dealer and Dealer Van 222 resides at a "home" location, e.g., the Dealer's residence.

With the present network architecture 200 and related processes, the Dealer can (i) upload orders; (ii) download accounting statements; (iii) review new products; (iii) distribute current Snap-on Incorporated marketing materials available without the need for pre-printed sheets or compact disks (CDs) or other storage media; (iv) download and/or display on demand product video clips, electronic product brochures, new product announcements; (v) instantly update user software for any Snap-on Incorporated diagnostic or other product without CDs or expensive storage media; (vi) increase cash flow and allow real time access to inventory, order status, credit transactions, credit approvals, payment status and general account information; etc.

To facilitate such benefits, the Dealer and/or Dealer Van 222 may be fitted with the replicating server 220. The replicating server 220 may be deployed as a computing system containing a processor, data storage, and software to carry out the replicating server functions. Coupled to, integrated with, or integral to the computing system may be one or more communication devices 224, such as wireless modems and/or access points. These communication devices 224 allow the computing system to connect via a wired or wireless link to the Internet, Local Area Network, Wide Area Network, or any other network.

With the wired or wireless communication link and authorized access to the front and back-office applications 216, the computing system in the Dealer Van 222 may be replicated. Some of the front office applications may alternatively stay local to the replicating server 220. For example, the computing system can replicate the latest product software, information, videos, and brochures; new product and service information; sales and business management application and data; dealer business information and related web pages; etc.

Taking advantage of otherwise idle time, replication may be performed during the off-hours at the Dealer Van's home location. When leaving to conduct business, the computing system in the Dealer Van 222 leaves its home location and may move out of communicable proximity to the front and back-office servers 212, 214. When doing so, the communication link with these servers may be terminated.

After arriving at the customer premises, e.g., an automotive service station, the computing system and communication devices 224 housed or otherwise coupled to on the Dealer Van 222 may move within communicable proximity to the customer systems and devices 250(*a-n*). Accordingly, the computing systems and communication devices 224 may establish a second wired or wireless communication link with the customer's systems and devices 250(*a-n*). Over this communication link, the computing system can distribute the latest product software, information, videos, and brochures; new product and service information; among other functions.

Moreover, present network architecture 200 and related processes provide the dealer with additional sales capabilities and opportunities. While at the customer premises, dealers, technicians and shop owners can perform software upgrades to Snap-on Incorporated diagnostic products and other equipment. To facilitate such upgrades, a software-upgrade application may be included on the replication server 220. This software-upgrade application may reside on the replication server 220 as a stand-alone application, a replicated front or back-office application 218, and/or some combination thereof. In any case, the upgrade information (code and/or data) may be a portion of the information replicated during replication with the front and/or back-office servers 212, 214.

The customer-premises equipment 250(*a-n*), such as Snap-on Incorporated diagnostic equipment or information kiosks, may be configured with software and/or hardware communication devices 224 to enable communication with the replicated front and/or back-office applications 216, such as the software-upgrade application. The software-upgrade application (along with other applications) may carry out the software upgrades (or other information distribution) via a push or pull technology.

Under push technologies, selected data is automatically delivered to a destination device, such as the customer-premises equipment 250(*a-n*), at prescribed intervals or based on some event. In contrast, pull distribution technology refers to the situation in which the destination device specifically asks for something by performing a search or requesting an existing report, video or other data type. For instance, the customer-premises equipment 250(*a-n*), using its communication device 224, may be configured to automatically detect a given wireless or wired communication beacon signal from the Dealer Van 222 when it arrives. And responsive to the beacon signal, the customer-premises equipment 250(*a-n*)

may query the replication server 220 for updates while the Dealer Van 222 is at the customer premises.

Alternatively, the client/server roles may be reversed so that when the Dealer Van 222 arrives at the customer premises, the computing system acts as the client requesting service from the customer-premises devices 250(*a-n*). In another alternative, the replicating server 220 and customer-premises devices 250(*a-n*) may exchange information as peers instead of a client/server relationship.

In cases where the customer-premises equipment 250(*a-n*) cannot be configured to automatically detect the beacon signal or configured with a wireless communication device, such as older model scan tools, a docking station connected to at least one of the customer-premises equipment 250(*a-n*) configured to automatically update can be also configured as an intermediary for updating the device by downloading the update from the Dealer Van's 222 computing system. In addition, the software-upgrade application may be linked with the DSS for automated billing and/or with product registration for warranty and future upgrade purposes.

Because many customers have become accustom to and expect immediate sales information and transactions, the present network architecture 200 and related processes may allow the Dealer to access important sales information and process credit-card sales in real-time, near real time or at least within 24 hours (with the appearance of real time processing). In one embodiment, the replicating server 220 can be embodied in a handheld computing system having an integrated and/or integral wireless communication device.

With recent advances in wireless technology, such as IEEE 802.11 et seq., demonstrating increased performance, throughput, and coverage distance, the handheld computing systems (as replications of at least a portion of the front and back-office servers 212, 214) may be used to print invoices, check stock and availability, and perform other tasks while the Dealer is in the shop.

While the handheld computing system may replicate directly from the front and back-office servers 212, 214, it can also replicate from the replicating server 220. In any case, the handheld computing systems may allow the Dealer to function when the Dealer Van 222 is out of communicable proximity to the customer premises. As such, the handhelds can alleviate communication problems caused by poor wireless or tethered connections.

In some instances, the time lag between replications may be undesirable due to the volatility of the replicated information. In one instance, one or more of the communication devices 224 coupled to the replicated server 220 may be configured to establish a communication link to front and/or back-office servers 212, 214. This communication link may be established via a public wireless or wired communication network and/or a private or core wireless or wired wide area network. Over this communication link, the replicated server 220 via a thin or rich client may ascertain the volatile information in real time or near real time.

Rich clients are advantageous for reducing connect time and its associated costs. By only updating the volatile information, such as price and availability, order status, new orders and account information, the rich client model eliminates the costs associated with downloading all the content as in a thin client model.

A new and powerful benefit of such configuration is the ability to process credit card orders and approval. By the linking credit processing on the replicating server 220, cash flow will increase and collections can be applied to the Dealer's account in a timely manner.

3. Exemplary Operation

Figure 3:
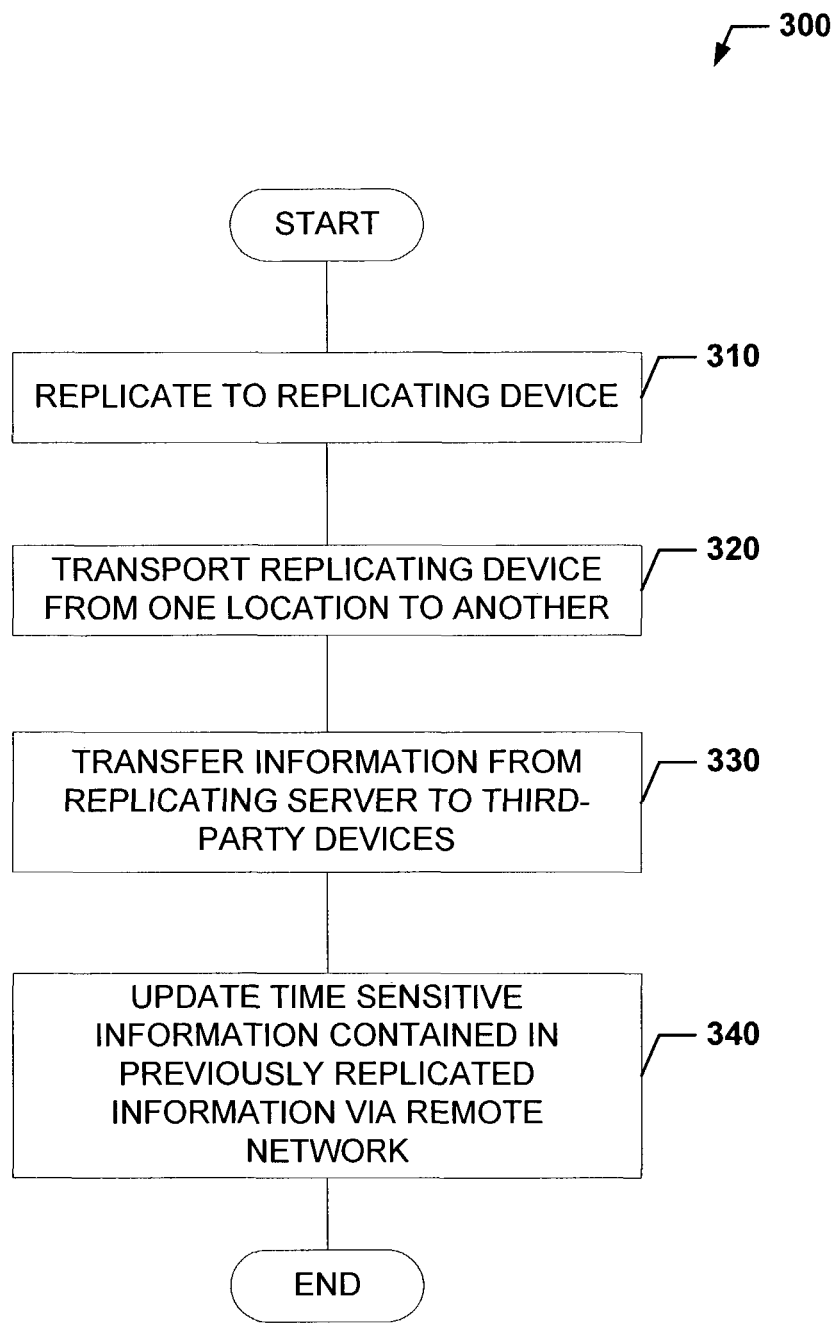
FIG. 3 is a first flow chart illustrating a first exemplary flow for carrying out the transferring of information between a master server and third-party clients using a replicating server.

FIG. 3 is a flow chart illustrating an exemplary flow 300 for carrying out the transferring of information between the master server 210 and the third-party clients 250(*a-n*) using the replicating server 220. The flow 300 is described in reference to FIG. 2, wherein the master server 210 is embodied as front and back-office servers 212, 214; the replicating server 220 is housed within a Dealer Van 222 and coupled with an IEEE 802.11 wireless access point, gateway and complementary communication card; and the customer-premises equipment 250(*a-n*) may be embodied as kiosk 251 and handheld diagnostic device 253, each of which has an IEEE 802.11 wireless access cards. Assume for this embodiment, that the Dealer Van 222 resides at the Dealer's residence or other location that has access to the front and back-office servers. It is to be understood that other communication protocols may also be used At the home location may be an intermediary device (not shown), such as wireless broadband modem, that is coupled to or integrated with an IEEE 802.11 wireless access device. These elements may be used for coupling the replicating server 220 and IEEE 802.11 wireless access point to the front and back-office servers 212, 214. Further assume that networks 230, 240 provide a wireless-local-area-network transport for communications between the front and back-office servers 212, 214 and the replicating server 220 when within the coverage area of the intermediary device, and between the replicating server 220 and the third-party devices 250(*a-n*) when within the communicable proximity of the third-party devices.

A. Replication

With reference to FIG. 3, the replicating server 220 via its portion of the replication application replicates or mirrors at least a portion of the information on the front and back-office servers as shown in block 310. The replication may be carried out in various ways as noted above.

Figure 4:
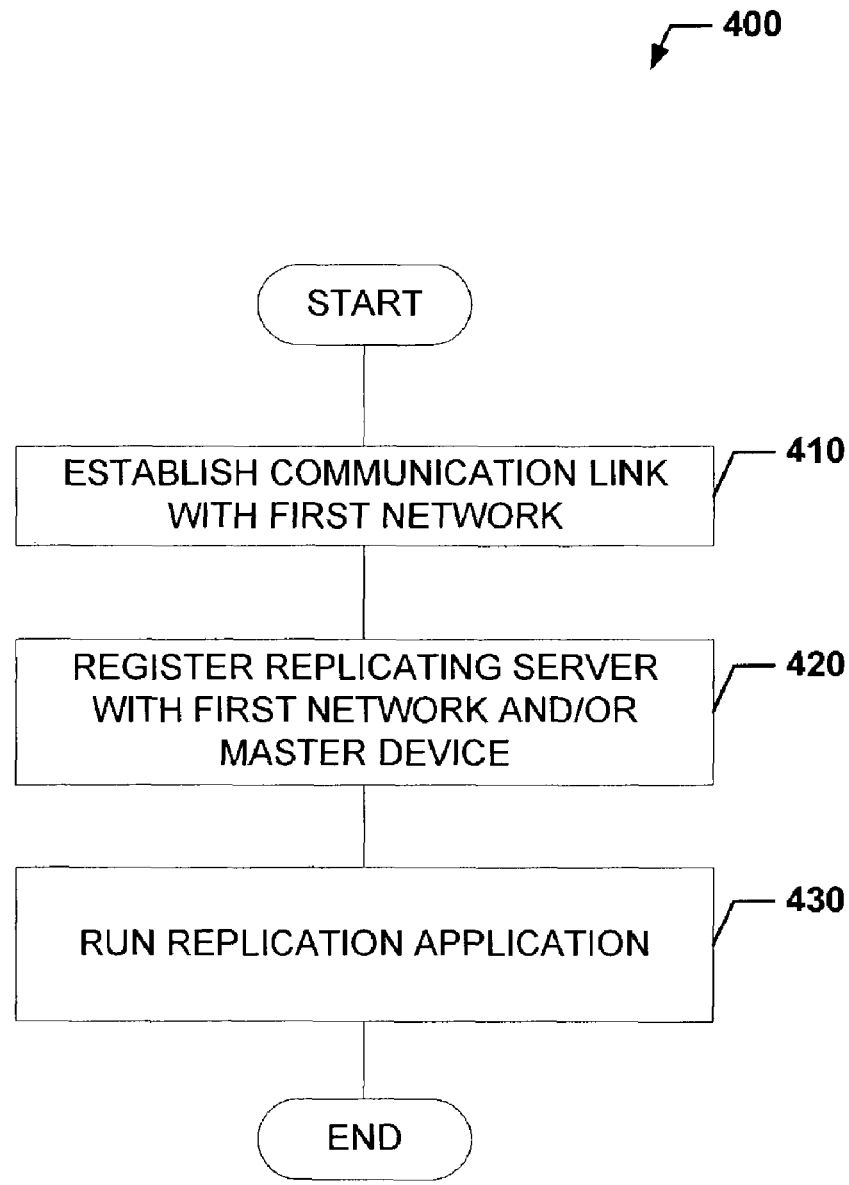
FIG. 4 is a second flow chart illustrating a first detailed flow for carrying out replication in accordance with an exemplary embodiment.

Referring now to FIG. 4, a detailed flow 400 for carrying out replication in accordance with an exemplary embodiment is shown. At block 410, the replicating server 220 first establishes a wireless communication link with the intermediary device. The wireless communication link may be established in response to the replicating server 220 (i) powering up, (ii) exiting from sleep mode, (ii) entering the coverage area of the WLAN, or (iv) otherwise notifying the WLAN of its presence. As such, a communication application coupled to the wireless access point 224 associated with the replicating server 220 may initiate registration and/or authentication with the wireless access device associated with the intermediary device ("intermediary-wireless-access device") to establish the wireless communication link. Alternatively, the intermediary-wireless-access device may initiate the registration and/or authentication process.

(1) Communication Registration and/or Authentication

In the former case, the replicating server 220 may register and/or authenticate with the WLAN as shown in block 420. Registering in the WLAN, in the simplest form, may include merely "associating" the replicating server 220 with (i) the WLAN when in infrastructure mode or (ii) the intermediary-wireless-access device when in ad-hoc mode. Additionally, registration also may include "logging" into the WLAN. Registration may employ secure connection services such as IEEE 802.11 Wired Equivalency Privacy (WEP), security system identification (SSID), or extensible authentication protocol (EAP). While similar to other wireless formats, registering with the WLAN may involve a different process than registering with a public wireless network. It should be understood, however, that other registration processes may be carried out in addition to or in lieu of the following exemplary process.

When the Dealer Van 222 arrives at its home location, the wireless access card 224 associated with the replicating server 220 senses the wireless medium 230. If the medium 230 is free, i.e. no other device is currently transmitting, then the replicating server 220 transmits a request for synchronization information from the intermediary-wireless-access device. On the other hand, if the wireless medium 230 is busy, the replicating server 220 delays transmission for a period of time before re-requesting the synchronization information.

The replicating server 220 may then receive the synchronization information by passive scanning, i.e. receiving a beacon frame containing the synchronization information from the intermediary-wireless-access device. Alternatively, the replicating server 220 may receive the synchronization information from the intermediary-wireless-access device by using an active scanning schema. The active scanning schema may be accomplished by transmitting Probe Request frames, and then waiting for a Probe Response frame from the intermediary-wireless-access device.

After synchronizing with wireless access point, the replicating server 220 may "authenticate" with the WLAN. To authenticate, the replicating server 220 exchanges frames, or packet-data, with the intermediary-wireless-access device. The exchange eventually results in the mutual verification of identity of each other. When attempting to authenticate with the intermediary-wireless-access device, the replicating server 220 sends an authentication request. In response and upon proper identity verification, the intermediary-wireless-access device sends to the replication server 220 an authentication response containing an indication of whether the association is successful or unsuccessful.

Since IEEE 802.11 provides for the Wired Equivalent Privacy (WEP) security measure, the replicating server 220 and the intermediary-wireless-access device may mutually authenticate with each other using WEP. It should be recognized other privacy services such as SSID, and EAP may be used. The benefits and risks for employing privacy mechanisms may depend on accessible content of WLANs, and the subscriber-types. Some of the readily available replication information might not require encryption mechanisms. On the other hand, WLAN access may require privacy mechanisms to secure access to confidential data.

Once the replicating server 220 mutually authenticates with the intermediary-wireless-access device, "associating" with the WLAN begins. If, however, either the replicating server 220 or the intermediary-wireless-access device do not mutually authenticate, then the intermediary-wireless-access device de-authenticates or otherwise denies WLAN access to the replicating server 220. The intermediary-wireless-access device will invoke de-authentication when the replicating server 220 presents incorrect credentials or authentication settings; fails applied communication protocol filters (e.g., Internet Protocol and medium access control (MAC) layer filters); or otherwise supplies invalid identification information.

In the process of associating, the replicating server 220 exchanges information with the intermediary-wireless-access device to which it is also authenticated. As part of the association process, the replicating server 220 sends an association request. The association request may include sending the IEEE 802.11 or some other format packet-data (802.11/packet-data) address of the replicating server 220. The association request may also include the 802.11/packet-data address of the intermediary-wireless-access device.

In response to the association request, the intermediary-wireless-access device sends the replicating server 220 an association response. The association response contains either a "successful" or an "unsuccessful" result. Upon "successful" association, the response may include an association identifier that notifies the replicating server 220 that the WLAN has data ready to send to it.

Once associated, the replicating server 220 is capable of transmitting and receiving communications. Ideally, the capability of transmitting and receiving communications extends to the replicating and service applications.

If other intermediary 802.11 devices are associated with the WLAN, the replicating server 220 may "re-associate" with the other wireless access points, with or without disassociating with intermediary-wireless-access device, in order to transmit and receive communications with the other wireless access points. In the re-association process, the replicating server 220 transmits a re-association request to the other intermediary wireless access points. The re-association request may include (i) the 802.11/packet-data address of the replicating sever 220, (ii) the 802.11/packet-data address of the intermediary-wireless-access device, and (iii) the 802.11/packet-data address of the other intermediary wireless access points. In response to the re-association request, the other intermediary wireless access points may send to the replicating server 220 a re-association response that includes a "successful" or an "unsuccessful" re-association request result, and a second association identifier.

Once re-associated, the replicating server 220 is capable of communicating with the wireless access point associated with the intermediary device, if still associated, and with the intermediary-wireless-access device. The capability of transmitting and receiving communications may extend to the WLAN to other wireless and fixed-access communication devices.

Once registered and/or authenticated, the replicating application installed on the front and back-office servers 212, 214 and the replicating server 220 synchronize one or more of the service applications by copying or updating the information to the replicating server 220, as shown in block 430. While the IEEE 802.11 wireless access device provide high speed communications capabilities, replicating only outmoded information is desirable.

As described above, the replicating server 220 registers and/or authenticates with the intermediary-wireless-access device. It should be noted that the intermediary-wireless-access device may register and/or authenticate with the replicating server 220. In either case, the replication application may be initiated by either device.

B. Transporting the Replicating Server

Referring back to FIG. 3 at block 320, the replicating server 220 and associated wireless access point 224 are transported by the Dealer Van 222 out of communicable proximity of the intermediary device and in turn the front and back-office servers 212, 214. As will be described in more detail below, the Dealer Van 222 may then transport the replicating server 220 and associated wireless access point into communicable proximity into of the third-party clients 250(*a-n*). Like the function described in block 310, the function of transporting the replicating server 220 out of communicable proximity to the front and back-office servers 212, 214 and into communicable proximity of the third-party clients 250(*a-n*) may be facilitated in different fashions. The following describes one embodiment of facilitating the transporting function.

(1) Communication Termination with Master Server

When leaving the proximity of the front and back-office servers 212, 214, the replicating server 220 may terminate the communication link between it and the front and back-office servers 212, 214. Under IEEE 802.11, the association between the intermediary-wireless-access device and the replicating server 220 may be terminated by either de-authentication or by disassociation. To disassociate, either the intermediary-wireless-access device or replicating server 220 transmits a disassociation notification message.

If the replication server 220 desires to disassociate with the intermediary-wireless-access device and the other intermediary wireless access points, the disassociation notification message may be broadcast to the multiple wireless access points. Included in the disassociation notification message is (i) the 802.11/packet-data address of the replicating server 220, (ii) the 802.11/packet-data address of wireless access point or points to which the replicating server 220 is currently associated; and (iii) if necessary, the broadcast 802.11/packet-data address. Upon receipt of the disassociation notification message, the intermediary-wireless-access device and other wireless access points disassociate, with no response sent to the replicating server 220.

To de-authenticate, the intermediary-wireless-access device, the other wireless access points, and/or replicating server 220 may transmit a de-authentication notification message. Included in the de-authentication message is (i) the 802.11/packet-data address of the replicating server 220, (ii) the 802.11/packet-data address of wireless access point to which the replicating server 220 is currently authenticated; and (iii) the broadcast 802.11/packet-data address.

Upon receipt of the de-authentication message, the intermediary-wireless-access device, other wireless access points, and replicating server 220 de-authenticate. Like disassociation, no response is sent to the replicating server 220. After de-authentication, partial disassociation, or complete disassociation, the replicating server 220 may no longer exchange communications with the WLAN.

C. Transferring Information with Third-Party Clients

Figure 5:
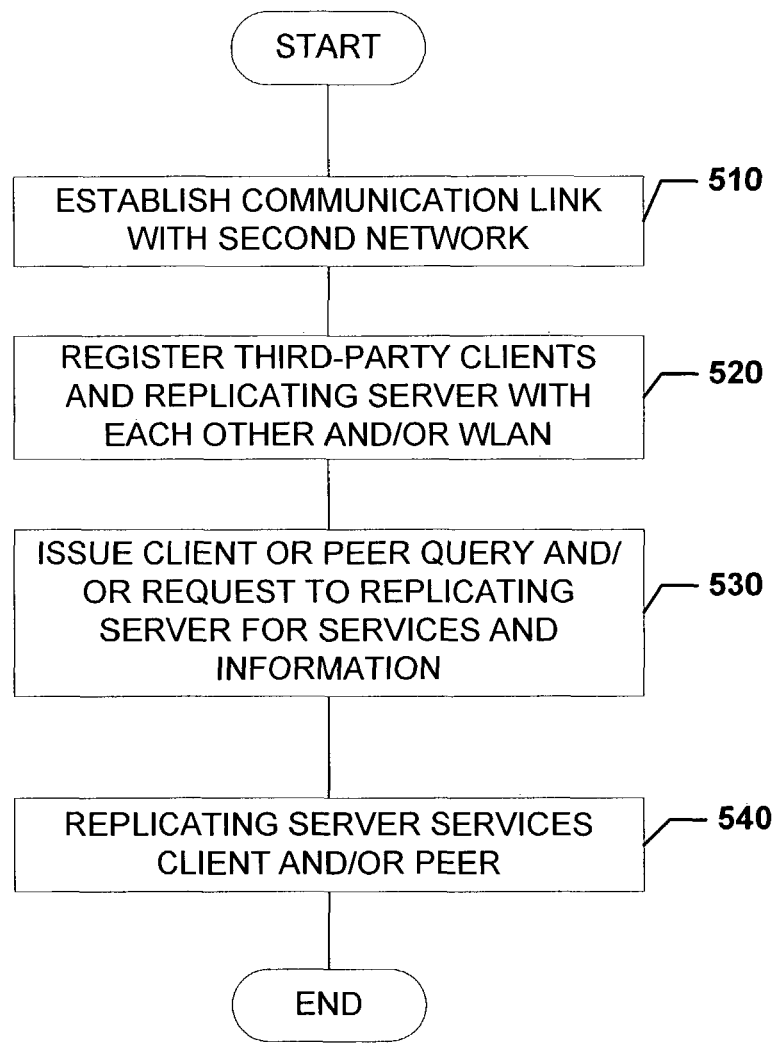
FIG. 5 is a third flow chart illustrating a second detailed flow for carrying out the function of transferring information to between a replicating server and customer-premises equipment in accordance with an exemplary embodiment.

After the Dealer Van 222 moves within communicable proximity of the customer-premises devices 250($a$-$n$), information from the replicating server 220 may be transferred to the customer-premises equipment 250($a$-$n$) as shown in block 330. Like the functions described in blocks 310, 320, the function of transferring information to between the replicating server 220 and the customer-premises equipment 250($a$-$n$) may be facilitated in different fashions. FIG. 5 is a detailed flow 500 for illustrating one such embodiment.

Given that the replicating server 220 contains the front and back-office service applications 216 and a wireless access point 224, the replicating server 220 housed in the Dealer Van 222 may be thought of as a mobile, wireless "portal" or "hotspot" of the front and back-office servers 212, 214 and applications 216. As such, a communication link between replicating server 220 and one or more of the customer-premises devices 250($a$-$n$) may be established as shown in block 510.

As noted above, after arriving at the customer premises, e.g., an automotive service station, the customer premises equipment 250($a$-$n$) may carry out information transfer using either a push or pull distribution technology. In either case, the kiosk 251, handheld diagnostic device 253, and/or other customer-premises equipment using their respective communication cards or chipsets may register and/or authenticate with each other or establish a WLAN as noted above and in accordance with the IEEE 802.11 standard as in block 520. Once registered and/or authenticated and while the Dealer Van 222 is in communicable proximity, the kiosk 251 and handheld diagnostic device 253 may query or request information from the replicating server 220 as if it is the front and/or back-office servers 212, 214.

In response the query or other request, the replicating server 220 services the client and/or peer customer-premises equipment 250($a$-$n$) via its service applications 218 as shown in block 540. Such services may be carried out over the IEEE 802.11 wireless interface or medium.

As a mobile "hotspot," the information for distribution from the replicating server 220 may be only as current as its last replication. In many instances, the time lag from the last replication may be more than acceptable for the replicated front and back office applications 218. In some other instances, however, the time lag from the last replication might not be suitable for the replicated front and back office applications 218. Referring once again to FIG. 3 at block 340, time sensitive information contained within the replicated served 220 may be updated via a remote access network. As noted above, full replication and/or replicating large amounts of information might be too slow and expensive, and thus, should be avoided. If need be, however, the full replication may be carried out.

To assist the Dealer, various identification schemes may be used to identify possibly outmoded non-static or variable information replicated to the replicating server 220. For example, the customer-premises equipment 250($a$-$n$), such as the kiosk 251, may be deployed with a rich client. This rich client may have a processing logic for differentiating current and up-to-date information from the possible outmoded information. Integrated with or coupled to the rich client may be a user interface for displaying the status of the replicated information. For example, the user interface may display green colored characters for indicating up-to-date information, yellow characters indicating possible outmoded information, and red characters for indicating that the information is out-of-date. Other schemes are possible as well.

The processing logic may automatically or, alternatively, may prompt a user to determine if the time sensitive information on the replicating server 220 should updated via a remote network (not shown). As with most networks, the replicating server 220 may register and/or authenticate with the remote network to establish a communication path between itself and the front and back-office servers 212, 214. Once a communication link is established, the replicating server 220 may update the time sensitive (and other) information, thereby providing the replicating server with up-to-date information. Instead of updating the time sensitive information on itself, the replicating server 220 may act as a conduit for providing such information directly to the rich client. After completing the updates, the remote communication link may be terminated.

CONCLUSION

In view of the wide variety of embodiments that can be applied, it should be understood that the illustrated embodiments are exemplary only, and should not be taken as limiting the scope of the following claims. For instance, in the exemplary embodiments described herein include vehicle mounted devices that may include or be utilized with any appropriate voltage source, such as a battery, an alternator and the like, providing any appropriate voltage, such as about 12 Volts, about 24 Volts, about 42 Volts and the like.

Further, the embodiments described herein may be used with any desired system or engine. Those systems or engines may comprises items utilizing fossil fuels, such as gasoline, natural gas, propane and the like, electricity, such as that generated by battery, magneto, solar cell and the like, wind and hybrids or combinations thereof. Those systems or engines may be incorporated into another systems, such as an automobile, a truck, a boat or ship, a motorcycle, a generator, an airplane and the like.

The embodiments described above, include computing systems, controllers, and other devices containing processors. These devices may contain at least one Central Processing Unit ("CPU") and a memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals.

The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the described methods.

The data bits may also be maintained on a computer readable medium including magnetic disks, optical disks, and any other volatile (e.g., Random Access Memory ("RAM")) or nonvolatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system.

The communication networks discussed above may be a current, future or legacy wireless communication network. In addition to details already discussed, the following provides a brief overview the capabilities of some of licensed wireless communications for second and third generation wireless networks. Second generation ("2G") networks can provide multimedia communication services. These 2G networks, however, have their foundation in older circuit-switched or packet-switched technologies that make the transmission of video and data quite slow and expensive. Thus, the 2G networks might limit the type of services that can be used.

Newer second-and-a-half generation ("2.5G") network services have recently been deployed. These 2.5G networks use newer packet-switched technologies that allow for increased transmission speeds for video and data as compared to 2G networks. Although having increased transmission speed as compared to 2G networks, current 2.5G networks might also have limitations on the types of services that can be used.

In addition to the 2G and 2.5G networks, the communication networks described above may take advantage of 3G network services, which allow for significantly faster data rates that in turn allow for a broader range of services. These 3G networks provide packet switched services with the capability of providing Internet Protocol traffic, such as Mobile Internet Protocol ("Mobile IP") traffic; symmetrical and asymmetrical data rates; multimedia services such as video conferencing and streaming video; international roaming among different 3G operating environments; and more.

Typical 3G systems include packet-based transmission of digitized voice, data and video. 3G networks encompass a range of wireless technologies such as Code Division Multiple Access ("CDMA"), Universal Mobile Telecommunications Service ("UMTS"), Wide-band CDMA ("WCDMA"), and others. Unlike the 2G and 2.5 limitations, deployments of 3G networks, such as 1xRTT (i.e., CDMA2000 phase 1, "1xEv-DO" and phase 2, "1xEV-DV), have sufficient bandwidth and other capabilities that allow for massive real time data communications.

Exemplary embodiments can conveniently take advantage of the higher data rates, the lower cost, and the superior (as compared with CDMA and other public wireless networks) building coverage of IEEE 802.11 wireless local area networks (WLAN), Bluetooth, and other private wireless networks. These WLANs, like 3G networks, allow a broad range of multimedia, video and data services.

The WLANs, which have their origin in Ethernet technology, provide packet switched services with the capability of providing Internet Protocol traffic; symmetrical and asymmetrical data rates; multimedia services such as video conferencing and streaming video; and more. As such, these WLANs may provide applications to carry out a communication in real-time.

Exemplary embodiments have been illustrated and described. Further, the claims should not be read as limited to the described order or elements unless stated to that effect. In addition, use of the term "means" in any claim is intended to invoke 35 U.S.C. §112, ¶6, and any claim without the word "means" is not so intended.

I claim:

1. A method of using a replicating server to transfer information between a master server located on supplier premises and a third-party client located on customer premises, wherein the replicating server is housed in a movable motor vehicle, the method comprising:
   replicating to the replicating server via a first wireless communication link at least a portion of information stored on the master server;
   using the motor vehicle to transport the replicating server to the customer premises and into communicable proximity of the third-party client;
   after the motor vehicle arrives at the customer premises, the third-party client automatically detecting a wireless beacon signal sent from the motor vehicle;
   in response to the third party client automatically detecting the beacon signal sent from the motor vehicle, the third-party client querying the replicating server for updates while the motor vehicle is at the customer premises; and
   thereafter, communicating at least a portion of the replicated information from the replicating server to the third-party client via a second wireless communication link.

2. The method of claim 1, further comprising:
   establishing the first wireless communication link,
   wherein the first wireless communication link is established between the replicating server and an intermediary device that couples the replicating server to the master server, and
   wherein the first wireless communication link is established in response to the replicating server powering up.

3. The method of claim 1, further comprising:
   establishing the first wireless communication link,
   wherein the first wireless communication link is established between the replicating server and an intermediary device that couples the replicating server to the master server, and
   wherein the first wireless communication link is established in response to the replicating server exiting from a sleep mode.

4. The method of claim 1,
   wherein the third-party client is embodied as a diagnostic tool, and
   wherein the information communicated between the replicating server and the third-party client comprises information for configuring the diagnostic tool for purchased vehicle applications.

5. The method of claim 4, wherein the purchased vehicle applications comprise an application for measuring a voltage.

6. The method of claim 5, wherein the measured voltage is a battery voltage.

7. The method of claim 4, wherein the purchased vehicle applications comprise an application for detecting a voltage.

8. The method of claim 7, wherein the detected voltage is a battery voltage.

9. The method of claim 4, wherein the purchased vehicle applications comprise an application for measuring an idle speed.

10. The method of claim 4, wherein the purchased vehicle applications comprise an application for detecting an idle speed.

11. The method of claim 4, wherein the purchased vehicle applications comprise an application for measuring an engine rpm.

12. The method of claim 4, wherein the purchased vehicle applications comprise an application for detecting an engine rpm.

13. The method of claim 4, wherein the purchased vehicle applications comprise an application for measuring a cam anomaly.

14. The method of claim 4, wherein the purchased vehicle applications comprise an application for detecting a cam anomaly.

15. The method of claim 1,
wherein the information communicated over the second wireless communication link is communicated using the IEEE 802.11 standard.

16. The method of claim 1, wherein the replicating server housed in the motor vehicle is coupled to an IEEE 802.11 wireless access point.

17. The method of claim 1, wherein the customer premises comprises an automotive service facility and the third-party client comprises an automotive diagnostic device.

18. The method of claim 1, wherein the customer premises comprises an automotive service facility and the third-party client comprises an information kiosk.

19. The method of claim 1, wherein the motor vehicle comprises a vehicle from which supplier goods are purchased.

20. The method of claim 1, wherein the master server comprises back office and front office servers.

21. The method of claim 20, wherein the step of replicating to the replicating server via the first wireless communication link at least a portion of information stored on the master server comprises replicating to the replicating server at least a portion of the back office and front office servers.

22. The method of claim 1, wherein the step of replicating to the replicating server via the first wireless communication link at least a portion of information stored on the master server occurs at least once weekly.

23. The method of claim 1, wherein the step of communicating at least a portion of the replicated information from the replicating server to the third-party client via the second wireless communication link is performed using a push technology.

24. The method of claim 1, wherein the step of communicating at least a portion of the replicated information from the replicating server to the third-party client via the second wireless communication link is performed using a pull technology.

25. A method of using a replicating server to transfer information between a master server located on supplier premises and an automotive diagnostic tool located on customer premises, wherein the replicating server is housed in a movable motor vehicle, the method comprising:

replicating to the replicating server via a first wireless communication link at least a portion of information stored on the master server;

using the motor vehicle to transport the replicating server to the customer premises and into communicable proximity of the automotive diagnostic tool;

after the motor vehicle arrives at the customer premises, the automotive diagnostic tool automatically detecting a wireless beacon signal sent from the motor vehicle;

in response to the automotive diagnostic tool automatically detecting the beacon signal sent from the motor vehicle, the automotive diagnostic tool querying the replicating server for updates while the motor vehicle is at the customer premises; and thereafter, communicating at least a portion of the replicated information from the replicating server to the automotive diagnostic tool via a second wireless communication link, wherein the replicated information communicated to the automotive diagnostic tool comprises information for configuring the automotive diagnostic tool for purchased vehicle applications.

26. The method of claim 25, wherein the purchased vehicle applications comprise an application for measuring a voltage.

27. The method of claim 26, wherein the measured voltage is a battery voltage.

28. The method of claim 25, wherein the purchased vehicle applications comprise an application for detecting a voltage.

29. The method of claim 28, wherein the detected voltage is a battery voltage.

30. The method of claim 25, wherein the purchased vehicle applications comprise an application for measuring an idle speed.

31. The method of claim 25, wherein the purchased vehicle applications comprise an application for detecting an idle speed.

32. The method of claim 25, wherein the purchased vehicle applications comprise an application for measuring an engine rpm.

33. The method of claim 25, wherein the purchased vehicle applications comprise an application for detecting an engine rpm.

34. The method of claim 25, wherein the purchased vehicle applications comprise an application for measuring a cam anomaly.

35. The method of claim 25, wherein the purchased vehicle applications comprise an application for detecting a cam anomaly.

36. The method of claim 25,
wherein the information communicated over the second wireless communication link is communicated using the IEEE 802.11 standard.

37. The method of claim 36, wherein the replicating server housed in the motor vehicle is coupled to an IEEE 802.11 wireless access point.

38. The method of claim 25, wherein the automotive diagnostic tool is a handheld automotive diagnostic tool.

* * * * *

UNITED STATES PATENT AND TRADEMARK OFFICE
CERTIFICATE OF CORRECTION

| | | |
|---|---|---|
| PATENT NO. | : 7,583,401 B2 | Page 1 of 1 |
| APPLICATION NO. | : 10/610402 | |
| DATED | : September 1, 2009 | |
| INVENTOR(S) | : Lewis | |

It is certified that error appears in the above-identified patent and that said Letters Patent is hereby corrected as shown below:

On the Title Page

Item [*] Notice: Subject to any disclaimer, the term of this patent is extended or adjusted under 35 USC 154(b) by 932 days Delete the phrase "by 932 days" and insert -- by 1,144 days --

Signed and Sealed this

Sixth Day of April, 2010

David J. Kappos
*Director of the United States Patent and Trademark Office*